(12) United States Patent
Yu et al.

(10) Patent No.: US 12,149,730 B2
(45) Date of Patent: Nov. 19, 2024

(54) MOTION REFINEMENT AND WEIGHTED PREDICTION

(71) Applicant: Telefonaktiebolaget LM Ericsson (publ), Stockholm (SE)

(72) Inventors: Ruoyang Yu, Täby (SE); Du Liu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 190 days.

(21) Appl. No.: 17/438,037

(22) PCT Filed: Mar. 5, 2020

(86) PCT No.: PCT/SE2020/050248
§ 371 (c)(1),
(2) Date: Sep. 10, 2021

(87) PCT Pub. No.: WO2020/185147
PCT Pub. Date: Sep. 17, 2020

(65) Prior Publication Data
US 2022/0150532 A1 May 12, 2022

Related U.S. Application Data

(60) Provisional application No. 62/816,594, filed on Mar. 11, 2019.

(51) Int. Cl.
*H04N 19/52* (2014.01)
*H04N 19/109* (2014.01)
(Continued)

(52) U.S. Cl.
CPC ........... *H04N 19/52* (2014.11); *H04N 19/109* (2014.11); *H04N 19/139* (2014.11);
(Continued)

(58) Field of Classification Search
CPC .... H04N 19/52; H04N 19/109; H04N 19/176; H04N 19/527
See application file for complete search history.

(56) References Cited

U.S. PATENT DOCUMENTS

2006/0256866 A1* 11/2006 Ziauddin ............... H04N 19/51
375/240.03
2011/0002387 A1* 1/2011 Chiu ...................... H04N 19/61
375/E7.123
(Continued)

FOREIGN PATENT DOCUMENTS

CN 104170381 A 11/2014
CN 108600765 A 9/2018
(Continued)

OTHER PUBLICATIONS

Chen, X. et al., "Decoder-Side Motion Vector Refinement Based on Bilateral Template Matching", Document: JVET-D0029, Joint Video Exploration Team (JVET) of ITU-T SG 16 WP 3 and ISO/IEC JTC 1/SC 29/WG 11, 4th Meeting: Chengdu, CN, Oct. 15-21, 2016 (4 pages).
(Continued)

*Primary Examiner* — Zaihan Jiang
(74) *Attorney, Agent, or Firm* — Rothwell, Figg, Ernst & Manbeck, P.C.

(57) ABSTRACT

A method for determining a prediction block for decoding or encoding a current block in a current picture of a video stream. The method includes obtaining a pair of initial motion vectors, the pair of initial motion vectors comprising a first initial motion vector and a second initial motion vector. The method also includes determining whether or not to refine the initial motion vectors. The method further includes refining the initial motion vectors as a result of determining to refine the initial motion vectors. The step of determining whether or not to refine the initial motion
(Continued)

vectors comprises: i) determining whether a first prediction scheme and/or a second prediction scheme is enabled and ii) determining to refrain from refining the initial motion vectors as a result of determining that either the first prediction scheme or second prediction scheme is enabled or determining to refine the initial motion vectors as a result of determining neither the first prediction scheme nor second prediction scheme is enabled.

5 Claims, 16 Drawing Sheets

(51) Int. Cl.
*H04N 19/139* (2014.01)
*H04N 19/172* (2014.01)
*H04N 19/176* (2014.01)
*H04N 19/527* (2014.01)

(52) U.S. Cl.
CPC ......... *H04N 19/172* (2014.11); *H04N 19/176* (2014.11); *H04N 19/527* (2014.11)

(56) References Cited

U.S. PATENT DOCUMENTS

| | | | | |
|---|---|---|---|---|
| 2011/0090964 | A1* | 4/2011 | Xu | H04N 5/144 |
| | | | | 375/E7.104 |
| 2013/0329797 | A1* | 12/2013 | Sugio | H04N 19/577 |
| | | | | 375/240.15 |
| 2018/0184117 | A1* | 6/2018 | Chen | H04N 19/52 |
| 2018/0262773 | A1* | 9/2018 | Chuang | H04N 19/577 |
| 2018/0278950 | A1* | 9/2018 | Chen | H04N 19/44 |
| 2018/0376166 | A1* | 12/2018 | Chuang | H04N 19/61 |
| 2019/0349588 | A1* | 11/2019 | Chen | H04N 19/33 |
| 2020/0128266 | A1* | 4/2020 | Xu | H04N 19/119 |
| 2020/0204807 | A1* | 6/2020 | Ye | H04N 19/577 |

FOREIGN PATENT DOCUMENTS

| | | | |
|---|---|---|---|
| WO | WO-2018121506 | * | 12/2017 |
| WO | 2018/002021 A1 | | 1/2018 |
| WO | 2018/121506 A1 | | 7/2018 |
| WO | 2018/172609 A2 | | 9/2018 |
| WO | 2019/001785 A1 | | 1/2019 |
| WO | 2020/146704 A1 | | 7/2020 |

OTHER PUBLICATIONS

Chen, C. et al., "Generalized bi-prediction for inter coding", Document: JVET-C0047, Joint Video Exploration Team (JVET) of ITU-T SG 16 WP 3 and ISO/IEC JTC 1/SC 29/WG 11, 3rd Meeting: Geneva, CH, May 26-Jun. 1, 2016 (4 pages).
International Search Report and Written Opinion dated Dec. 18, 2020 in International Application No. PCT/SE2020/050248 (18 pages total).
Revised International Search Report in International Application No. PCT/SE2020/050248, corrected Jan. 21, 2021 (7 pages total).
Corrected Written Opinion dated Dec. 18, 2020 in International Application No. PCT/SE2020/050248 (12 pages total).
International Preliminary Report on Patentability dated Apr. 30, 2021 in International Application No. PCT/SE2020/050248 (13 pages total).
Yu, R. et al., "Non-CE9: On DMVR and GBI", Joint Video Experts Team (JVET) of ITU-T SG 16 WP 3 and ISO/IEC JTC 1/SC 29/WG 11, Document: JVET-N0153, 14th Meeting: Geneva, CH, Mar. 19-27, 2019 (3 pages total).
Chen, C. et al., "CE4-related: Reduction of interactions between bi-prediction coding tools", Joint Video Experts Team (JVET) of ITU-T SG 16 WP 3 and ISO/IEC JTC 1/SC 29/WG 11, JVET-N0086-v1, 14th Meeting: Geneva, CH, Mar. 19-27, 2019, pp. 1-5 (7 pages).
Bross, B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1001-v6 (295 pages).

* cited by examiner

| merge_idx | Merge Candidate List |
|---|---|
| 0 | MV0= (3, 2), MV1 = (-1,0) |
| 1 | MV0 = (0,1) |
| 2 | MV1 = (0,-1) |
| 3 | MV0 = (3, 2) |
| 4 | MV0 = (1, 1), MV1 = (-1, -1) |
| 5 | MV0 = (0, 0), MV1 = (0, 0) |

1100 s1102: For a bi-predicted (merge) block with WP enabled, derive MV0 and MV1 (Assuming the WP parameters for L0 is W0 and O0 and the WP parameters for L1 are W1 and O1)

s1104: DMVR Search:

For each of a plurality of offset candidates (MVoffset) within a predefined range, perform the following steps:

1. Generate a pair of modified motion vectors:
   MV0' = MV0 + MVoffset, MV1' = MV1 − MVoffset 2. Derive a first initial prediction block P0 using MV0' and modify P0 to obtain a first prediction block P0' = W0 × P0 + O0

3. Derive a second initial prediction block P1 using MV1' and modify P1 to obtain a second prediction block P1' = W1 × P1 + O1

4. Measure a sample value difference using P0' and P1'

Find the smallest difference among a plurality of sample value differences obtained using different offset candidates s1106: Derive a pair the best motion vectors using the best MVoffset where:

MV0_best = MV0 + MVoffsetBest

MV1_best = MV1 − MVoffsetBest s1108: Generate final prediction Pbi by:

1. Generating a first best prediction block (P0_best) using MV0_best

2. Generate a second best prediction block (P1_best) using MV1_best

3. Combine P0_best and P1_best:
   Pbi = (W0 × P0_best + O0 + W1 × P1_best + O1) >> 1

FIG. 11

MOTION REFINEMENT AND WEIGHTED PREDICTION

CROSS REFERENCE TO RELATED APPLICATIONS

This application is a 35 U.S.C. § 371 National Stage of International Patent Application No. PCT/SE2020/050248, filed Mar. 5, 2020, which claims priority to U.S. provisional application No. 62/816,594, filed on Mar. 11, 2019. The above identified applications are incorporated by reference.

TECHNICAL FIELD

Disclosed are embodiments related to motion refinement and weighted prediction for a video sequence.

BACKGROUND

A video sequence contains a series of pictures sequenced in a display order. Each picture is assigned with a Picture Order Count (POC) value indicating its display order.

Video coding is used to compress the video sequence into a sequence of coded pictures. Usually, a picture is divided into blocks with sizes ranging from 4×4 to 128×128. The blocks serve as the basis for coding each picture. A video decoder then decodes the coded pictures into pictures containing sample values.

The draft Versatile Video Coding (VVC) standard uses a block structure referred as quadtree plus binary tree plus ternary tree block structure (QTBT+TT), where each picture is first partitioned into square blocks called coding tree units (CTUs). The sizes of all CTUs are identical and the partition of the picture into the CTUs is performed without any syntax controlling the partition. Each CTU is further partitioned into coding units (CU) that can have either square or rectangular shapes. The CTU is first partitioned by a quad tree structure, then it may be further partitioned with equally sized partitions either vertically or horizontally in a binary structure to form CUs. A block could thus have either a square or rectangular shape. The depth of the quad tree and binary tree can be set by the encoder in the bitstream. An example of dividing a CTU using QTBT is illustrated in FIG. 1A. The ternary tree (TT) part adds the possibility to divide a CU into three partitions instead of two equally sized partitions. This increases the possibilities to use a block structure that better fits the content structure in a picture.

Intra Prediction (Also Known as Spatial Prediction)

Intra prediction techniques aim to explore the similarity among different blocks of the same picture. Intra prediction predicts a block in a picture using previously decoded blocks in the same picture. One way of predicting a block is predicting (i.e., determining) values (e.g., luminance, chrominance) of display elements included in the block. A picture consisting of only intra-predicted blocks is referred to as an intra picture.

Inter Prediction (Also Known as Temporal Prediction)

Inter prediction techniques aim to explore the similarity among pictures. Inter prediction predicts a block in a current picture (the "current block") using one or more blocks in previously decoded pictures. The samples from blocks in the previously decoded pictures are used to predict the samples inside the current block. The previously decoded pictures are referred to as reference pictures and the blocks in the previously decoded pictures are referred to as reference blocks.

The location of a referenced block inside a reference picture is indicated using a motion vector (MV). Each MV comprises x and y components each of which represents a displacement of the current picture with respect to a reference picture in x or y dimension. The value of a component may have a resolution finer than an integer position. In such case, a filtering (e.g., interpolation) may be used to calculate values used for prediction. FIG. 1B illustrates an exemplary MV for the current block C in the current picture.

An inter picture may use several reference pictures. The reference pictures are usually included in two different reference picture lists: L0 and L1. The reference pictures that are displayed before the current picture are typically the first pictures in the list L0 and the reference pictures that are displayed after the current picture are typically the first pictures in the list L1.

A block of a current picture is called an inter block if it is predicted from at least one reference block in a reference picture which is not the current picture. An inter block may be predicted using one of two prediction types, uni-prediction and bi-prediction. In uni-prediction, an inter block is predicted from one reference picture selected from either the list L0 or list L1. On the contrary, in bi-prediction, an inter block is predicted from two reference pictures selected from both the list L0 and list L1. FIG. 2 shows an inter block 201 that is predicted using uni-prediction and an inter block 203 that is predicted using bi-prediction.

In a typical bi-prediction scheme, the final prediction block for the current block is generated by averaging the sample values from two prediction blocks obtained using the two motion vectors. The process of generating a prediction block using a motion vector is referred to as motion compensation. The output prediction block of motion compensation can also be referred to as motion compensated block.

In FIG. 2, there are two motion vectors MV0 and MV1 corresponding to the inter block Pbi. First prediction block P0 is obtained using the MV0 and second prediction block P1 is obtained using the MV1. The inter block Pbi (i.e., the predicted block) is generated using the equation $Pbi(x,y) = (P0(x,y) + P1(x,y)) \gg 1$, where $Pbi(x,y)$ is the sample value at position (x,y) in the block Pbi. In other words, each sample value in the predicted block Pbi is calculated as an average of the corresponding sample values in the first prediction block P0 and the second prediction block P1.

Weighted Prediction (WP)–a Picture Level Tool

WP is a tool that applies a multiplicative factor and an additive offset to the prediction block obtained from a motion vector.

When WP is enabled, after a prediction block P is obtained from motion compensation (using a motion vector), each sample value in P is further modified using the equation $P'(x,y) = W \times P(x,y) + O$, where $P(x,y)$ is the sample value at position (x,y) in the prediction block P, $P'(x,y)$ is the sample value at position (x,y) in the modified prediction block P', W is a weighting factor, and O is an offset. Both W and O are referred to as the WP parameters. The WP parameters can be signaled at picture level. In other words, the same WP parameters can be used for different blocks in the same picture but different WP parameters can be used for different pictures.

The following table shows an example of syntax for WP in HEVC and VVC.

```
pred_weight_table( ) {
    ...
    for (i = 0; i <= num_ref_idx_l0_active_minus1; i++)
        luma_weight_l0_flag[i]
    ...
    for (i = 0; i <= num_ref_idx_l0_active_minus1; i++) {
        if (luma_weight_l0_flag[i]) {
            delta_luma_weight_l0[i]
            luma_offset_l0[i]
        }
    ...
    }
    ...
    if (slice_type == B) {
        for (i = 0; i <= num_ref_idx_l1_active_minus1; i++)
            luma_weight_l1_flag[i]
        ...
        for (i = 0; i <= num_ref_idx_l1_active_minus1; i++) {
            if (luma_weight_l1_flag[i]) {
                delta_luma_weight_l1[i]
                luma_offset_l1[i]
            }
            ...
        }
    }
}
```

The num_ref_idx_lx_active_minus1 (x being 0 or 1) specifies the number of reference pictures in Lx (x being 0 or 1) used for the current picture. For each reference picture in Lx, the luma_weight_lx_flag indicates whether WP should be enabled when using this reference picture. When the luma_weight_lx_flag is not zero, the delta_luma_weight_lx and luma_offset_lx are obtained. The delta_luma_weight_lx is used for deriving the weighting factor and the luma_offset_lx is used for deriving the offset. However, when luma_weight_lx_flag is zero, it means WP is not used for this reference picture. In such case, the default weight and offset (e.g., W=1 and O=0) should be used instead.

In a bi-prediction scheme where weighted prediction is enabled for both reference pictures, the WP parameters for a L0 reference picture (i.e., W0 and O0) and the WP parameters for a L1 reference picture (i.e., W1 and O1) are obtained. Thus, the final prediction block will be ((W0×P0+O0)+(W1×P1+O1))>>1, where P0 is the prediction block from the L0 reference picture and P1 is the prediction block from the L1 reference picture.

Generalized Bi-Prediction/Bi-Prediction with Weighted Averaging (BWA)–a Block Level Tool In addition to WP, VVC also provides generalized bi-prediction/bi-prediction with weighted averaging (BWA). BWA is a block level tool providing weighted averaging of multiple (e.g., two) prediction blocks.

In BWA, the final prediction block Pbi may be expressed as (W0×P0+W1×P1+4)>>3, where W0=(8−W1) and a total of five weights are allowed for W1 (e.g., W1∈{−2, 3, 4, 5, 10}. For low-delay pictures (i.e., all reference pictures have smaller POC value than the POC of the current picture), all five weights are used. On the contrary, for non-low-delay pictures (i.e., at least one of the reference pictures has a POC value larger than the POC value of the current picture), only three weights (e.g., W1∈{3, 4, 5}) are used.

In BWA, an appropriate value of W1 is obtained based on an index (gbi_idx) that is signaled for a CU. Specifically, the gbi_idx is used for retrieving corresponding weights from a look-up table (gbiWLut). For example, if gbiWLut[k]={4, 5, 4, 10, −2}, gbi_idx having a value of 1 would result in W1=gbiWLut[1]=5 and W0=8−W1=3. Here, gbi_idx is referred as a BWA parameter. When gbi_idx is equal to zero, then both W0 and W1 are equal to 4 and thus would result in a default bi-prediction averaging. Compared to WP, BWA allows different weights to be used for different CUs in the same picture to generate prediction blocks and thus offers a greater flexibility.

The following table shows an example of syntax table related to BWA in VVC.

| | Descriptor |
|---|---|
| coding_unit (x0, y0, cbWidth, cbHeight, treeType) {<br>  ...<br>  if (sps_gbi_enabled_flag && inter_pred_idc [x0][y0] == PRED_BI &&<br>    luma_weight_l0_flag [ref_idx_l0 [x0][y0]] == 0 &&<br>    luma_weight_l1_flag [ref_idx_l1 [x0][y0]] == 0 &&<br>    chroma_weight_l0_flag [ref_idx_l0 [x0][y0]] == 0 &&<br>    chroma_weight_l1_flag [ref_idx_l1 [x0][y0]] == 0 &&<br>    cbWidth * cbHeight >= 256)<br>    gbi_idx [x0][y0]<br>  ...<br>} | <br><br><br><br><br><br><br><br>ae(v) |

Inter Prediction Information/Motion Information

For an inter block inside an inter picture, its inter prediction information may comprise the following three elements:

1. A reference picture list flag (RefPicListFlag)—The flag indicates which reference picture list is to be used. For example, when the value of the flag equals to 0, it means List 0 is used. When the value of the flag equals to 1, it means List 1 is used. When the value of the flag equals to 2, it means both List 0 and List 1 are used.
2. A reference picture index (RefPicIdx)—The index indicates which reference picture inside the reference picture list is to be used.
3. A motion vector (MV)—The vector indicates a position inside the reference picture that is to be used for predicting the current block.

In this disclosure, the inter prediction information is also referred to as motion information. Motion information is stored in each inter block and thus each inter block maintains its own motion information.

Motion Information Signaling

The current VVC includes several methods of signaling motion information for each block. One of them is merge. The motivation of methods described here is to use the motion information in other blocks to predict the motion information for a current block.

Merge Method

A merge method in VVC is similar to the one provided by High Efficiency Video Coding (HEVC) standard. The method first generates a list (i.e., merge list) of motion information candidates. The length of merge list is 6 in VVC (version 4) and 5 in HEVC. The candidates are derived from other coded blocks. For example, the coded blocks may be temporal collocated blocks or spatially adjacent neighboring blocks like the ones shown in FIG. 3A. FIG. 3A shows five spatially neighboring blocks (left (L), top (T), top-left (TL), top-right (TR), left-bottom (LB)) which are motion information candidates included in a merge list. After the merge list is generated, one of the motion information candidates is selected to be used to drive the motion information of the current block. The selection of the candidates is performed on an encoder side. After the encoder selects the best candidate, the encoder includes an index (merge_idx) in the bitstream sent to a decoder. The decoder receives the index and it follows the same merge list derivation process as the encoder and use the index to retrieve the correct candidate.

FIG. 3B is an example of a merge candidate list. For simplicity, only motion vectors for each candidate are listed. According to the merge list shown in FIG. 3B, when the merge index (merge_idx) is equal to 4, MV0=(1, 1) and MV1=(-1, -1) will be selected as the motion vectors for the current block.

Motion vectors of a current block may be further refined by a tool called Decoder side Motion Vector Refinement (DMVR). It is generally applicable to merge mode and requires MVs to be bi-predictive. For a block in the merge mode, the initial MVs of the block are derived using the merge mode. DMVR searches around the initial MVs and find the MVs giving the smallest difference between L0 prediction block and L1 prediction block.

SUMMARY

Certain challenges presently exist. For example, in conventional DMVR search, bi-prediction parameters and/or weighted prediction parameters are not considered. This lack of consideration of the prediction parameters might affect the accuracy of DMVR search and thus have negative impact on the DMVR performance.

The embodiments of this disclosure improve the accuracy of DMVR search by considering prediction parameters (e.g., WP parameters or BWA parameters) during DMVR search.

According to some embodiments, in one aspect there is provided a process for determining a prediction block for decoding or encoding a current block in a current picture of a video stream. The process may begin with obtaining a first pair of initial motion vectors, the first pair of initial motion vectors comprising a first initial motion vector and a second initial motion vector. The process also includes: obtaining a first prediction parameter; obtaining a second prediction parameter; generating a first pair of modified motion vectors using the first pair of initial motion vectors and a first motion vector offset, the first pair of modified motion vectors comprising a first modified motion vector and a second modified motion vector, obtaining a first prediction block using the first modified motion vector, obtaining a second prediction block using the second modified motion vector, calculating a first difference using the first prediction block and the second prediction block, generating a second pair of modified motion vectors using the first pair of initial motion vectors and a second motion vector offset, the second pair of modified motion vectors comprising a third modified motion vector and a fourth modified motion vector, obtaining a third prediction block using the third modified motion vector; obtaining a fourth prediction block using the fourth modified motion vector, calculating a second difference using the third prediction block and the fourth prediction block, determining a best motion vector offset using the first difference and the second difference, and determining the prediction block using the determined best motion vector offset.

In some embodiments, obtaining the first prediction block comprises deriving an initial first prediction block using the first modified motion vector and deriving the first prediction block using the initial first prediction block and at least the first prediction parameter, and obtaining the third prediction block comprises deriving an initial third prediction block using the third modified motion vector and deriving the third prediction block using the initial third prediction block and at least the first prediction parameter.

With respect to other embodiments, in one aspect there is provided a process for determining a prediction block for decoding or encoding a current block in a current picture of a video stream. The process may begin with obtaining a pair of initial motion vectors, the pair of initial motion vectors comprising a first initial motion vector and a second initial motion vector. The process further includes determining whether or not to refine the initial motion vectors (s904, s1604), wherein determining whether or not to refine the initial motion vectors comprises determining whether or not a first prediction scheme is enabled. The process further includes refining the initial motion vectors as a result of determining to refine the initial motion vectors or refraining from refining the initial motion vectors as a result of determining not to refine the initial motion vectors.

In another aspect there is provided a computer program comprising instructions which, when executed on at least one processor, cause the at least one processor to carry out any one of the methods disclosed herein. In another aspect there is provide a carrier containing the computer program, wherein the carrier is one of an electronic signal, optical signal, radio signal, or computer readable storage medium.

In another aspect there is provided an encoder or decoder apparatus that is operable to perform any one of the methods disclosed herein. In one embodiment, the encoder or decoder apparatus includes processing circuitry and a memory. In one embodiment, the memory stores the above mentioned computer program.

BRIEF DESCRIPTION OF THE DRAWINGS

The accompanying drawings, which are incorporated herein and form part of the specification, illustrate various embodiments.

FIG. 11 shows a DMVR process according to one embodiment.

DETAILED DESCRIPTION

Figure 1A:
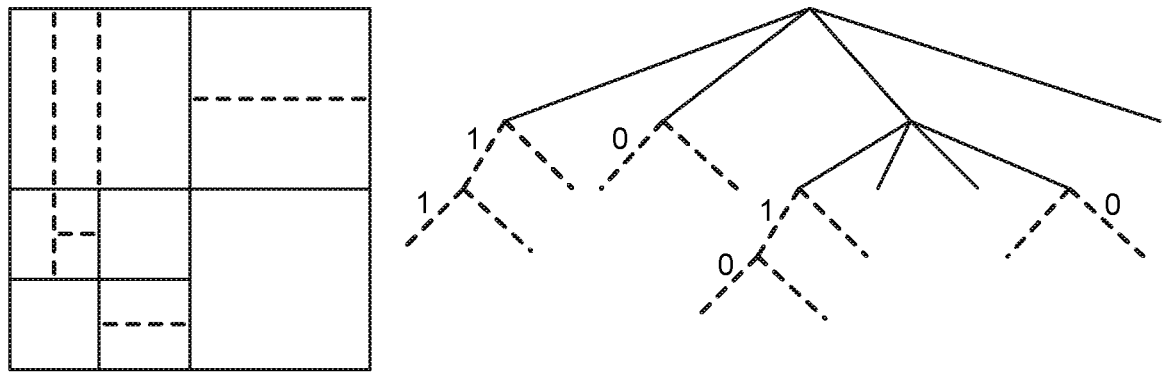
FIG. 1A shows an exemplary partitioning of a CTU into CUs using QTBT.
Figure 1B:
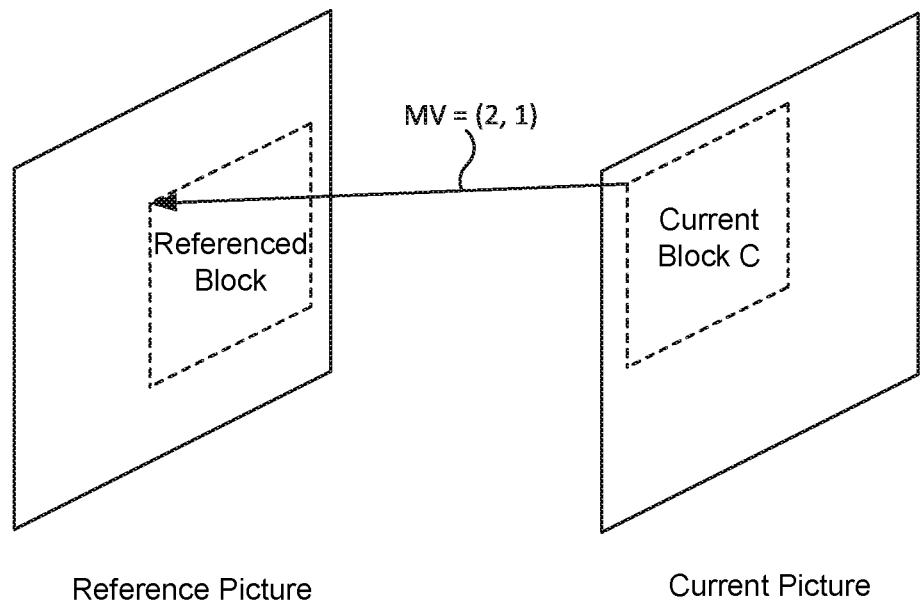
FIG. 1B shows motion vectors for blocks in a current picture.
Figure 2:
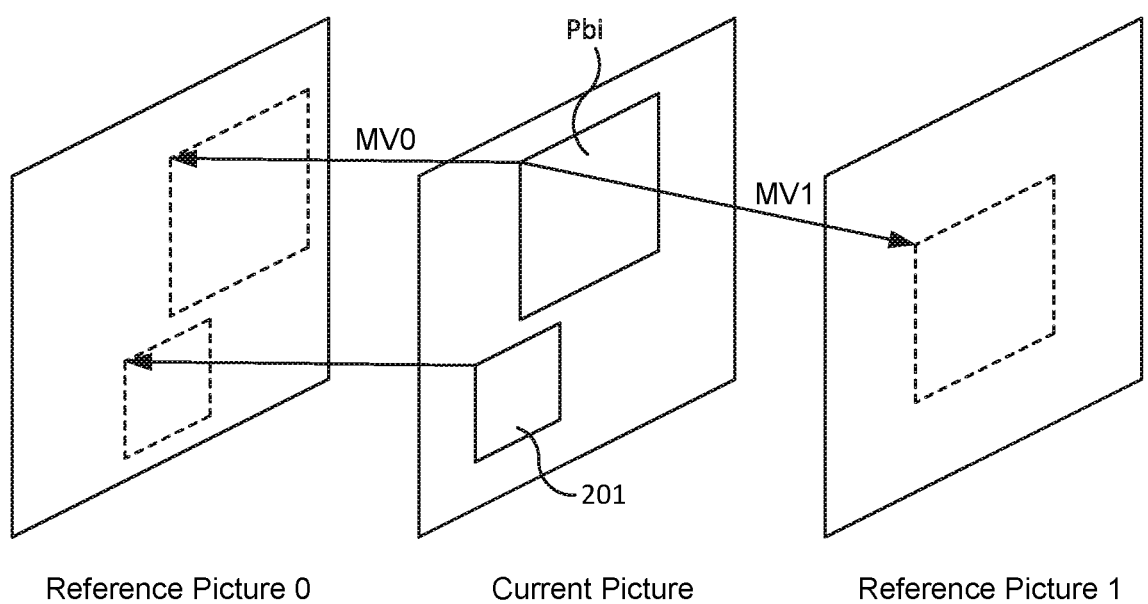
FIG. 2 illustrates uni-prediction and bi-prediction.
Figures 3A, 3B:
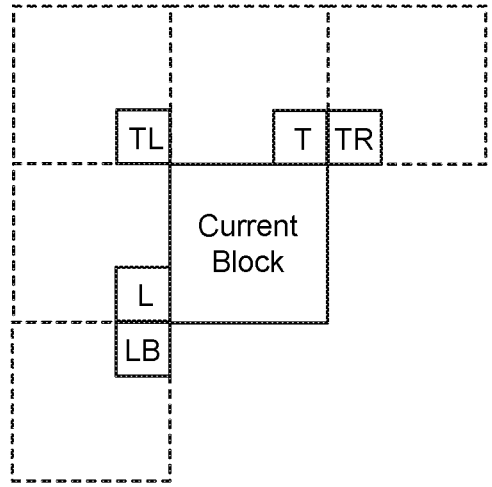
FIG. 3A shows possible spatial blocks for fetching neighboring motion information.
FIG. 3B shows an example of a merge candidate list.
Figure 4:
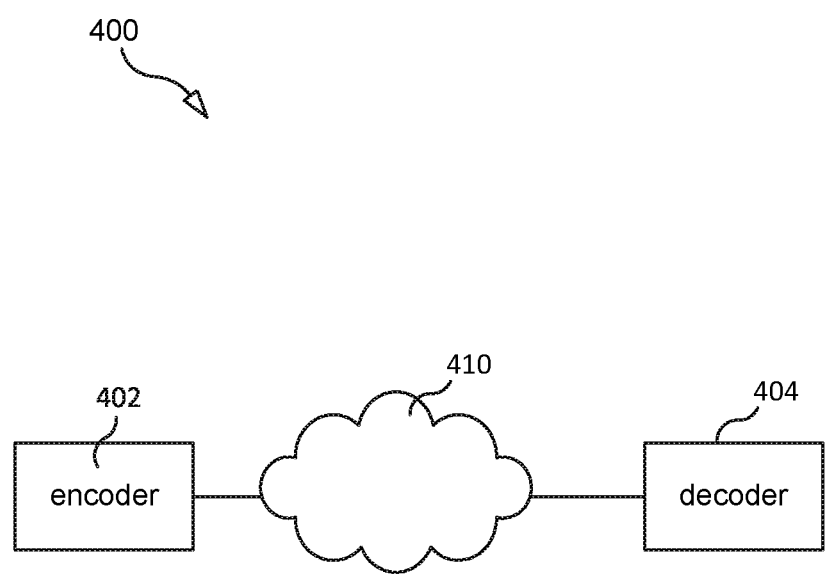
FIG. 4 illustrates a system according to an embodiment.

FIG. 4 illustrates a system 400 according to an example embodiment. System 400 includes an encoder 402 in communication with a decoder 404 via a network 410 (e.g., the Internet or other network).

Figure 5:
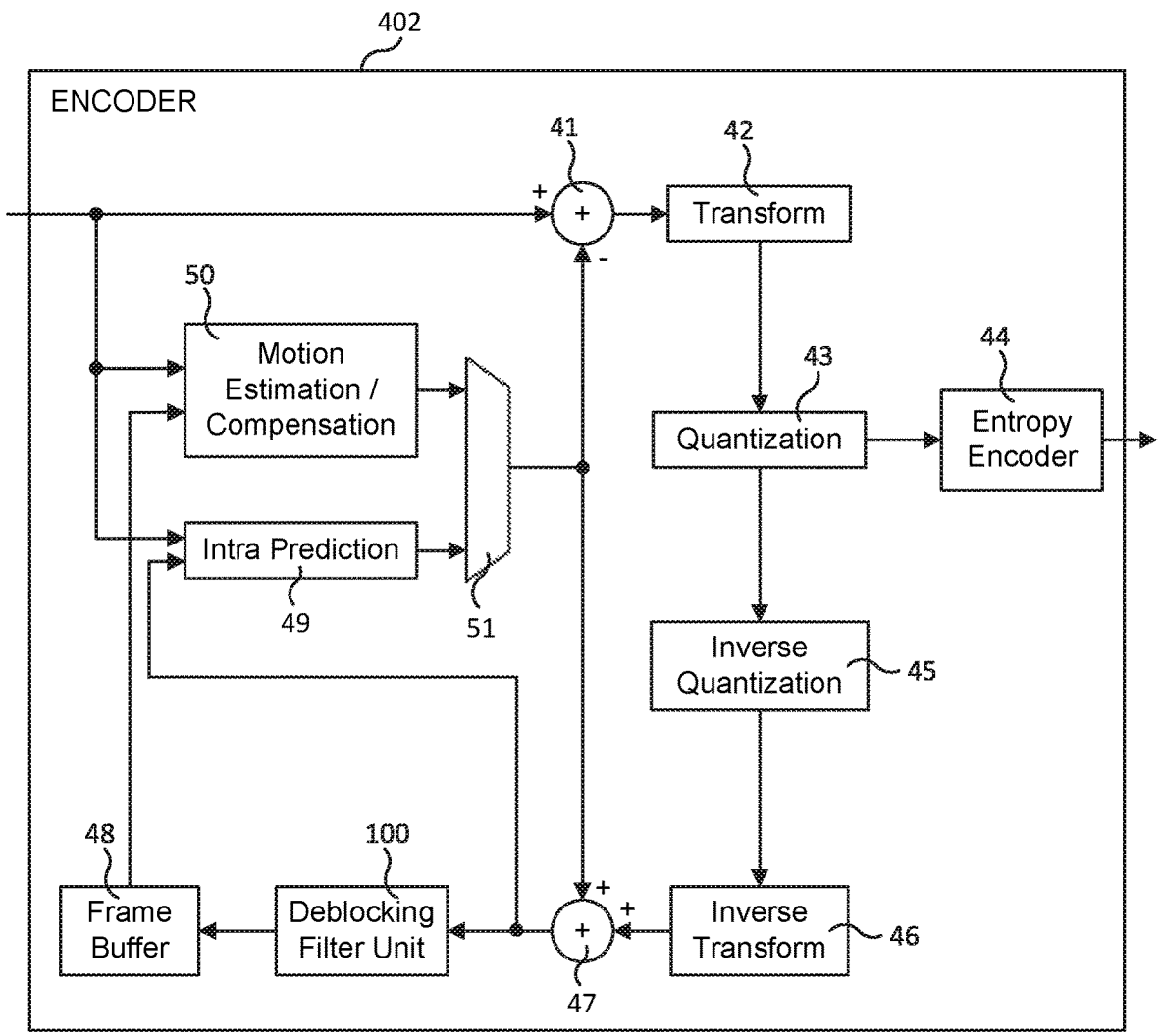
FIG. 5 is a schematic block diagram of an encoder according to an embodiment.

FIG. 5 is a schematic block diagram of encoder 402 for encoding a block of pixel values (hereafter "block") in a video frame (picture) of a video sequence according to an embodiment. A current block is predicted by performing a motion estimation by a motion estimator 50 from an already provided block in the same frame or in a previous frame. The result of the motion estimation is a motion or displacement vector associated with the reference block, in the case of inter prediction. The motion vector is utilized by a motion compensator 50 for outputting an inter prediction of the block. An intra predictor 49 computes an intra prediction of the current block. The outputs from the motion estimator/compensator 50 and the intra predictor 49 are input in a selector 51 that either selects intra prediction or inter prediction for the current block. The output from the selector 51 is input to an error calculator in the form of an adder 41 that also receives the pixel values of the current block. The adder 41 calculates and outputs a residual error as the difference in pixel values between the block and its prediction. The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block. The transformed and quantized residual error for the current block is also provided to an inverse quantizer 45 and inverse transformer 46 to retrieve the original residual error. This error is added by an adder 47 to the block prediction output from the motion compensator 50 or the intra predictor 49 to create a reference block that can be used in the prediction and coding of a next block. This new reference block is first processed by a deblocking filter unit 100 according to the embodiments in order to perform deblocking filtering to combat any blocking artifact. The processed new reference block is then temporarily stored in a frame buffer 48, where it is available to the intra predictor 49 and the motion estimator/compensator 50.

Figure 6:
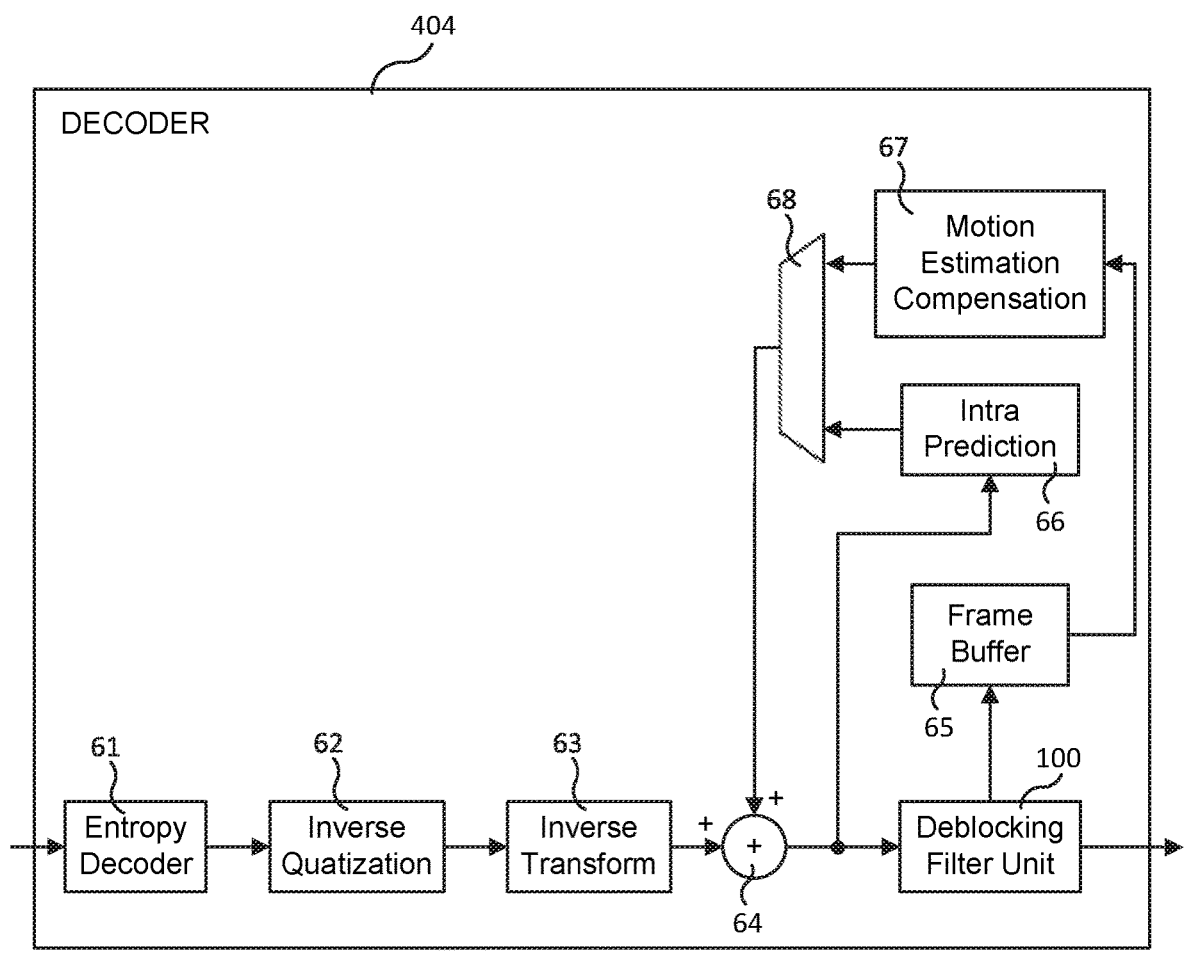
FIG. 6 is a schematic block diagram of an decode according to an embodiment.

FIG. 6 is a corresponding schematic block diagram of decoder 404 according to some embodiments. The decoder 404 comprises a decoder 61, such as entropy decoder, for decoding an encoded representation of a block to get a set of quantized and transformed residual errors. These residual errors are dequantized in an inverse quantizer 62 and inverse transformed by an inverse transformer 63 to get a set of residual errors. These residual errors are added in an adder 64 to the pixel values of a reference block. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block output form the adder 64 is input to a deblocking filter unit 100 according to the embodiments in order to deblocking filter any blocking artifacts. The filtered block is output form the decoder 504 and is furthermore preferably temporarily provided to a frame buffer 65 and can be used as a reference block for a subsequent block to be decoded. The frame buffer 65 is thereby connected to the motion estimator/compensator 67 to make the stored blocks of pixels available to the motion estimator/compensator 67. The output from the adder 64 is preferably also input to the intra predictor 66 to be used as an unfiltered reference block.

Figure 7:
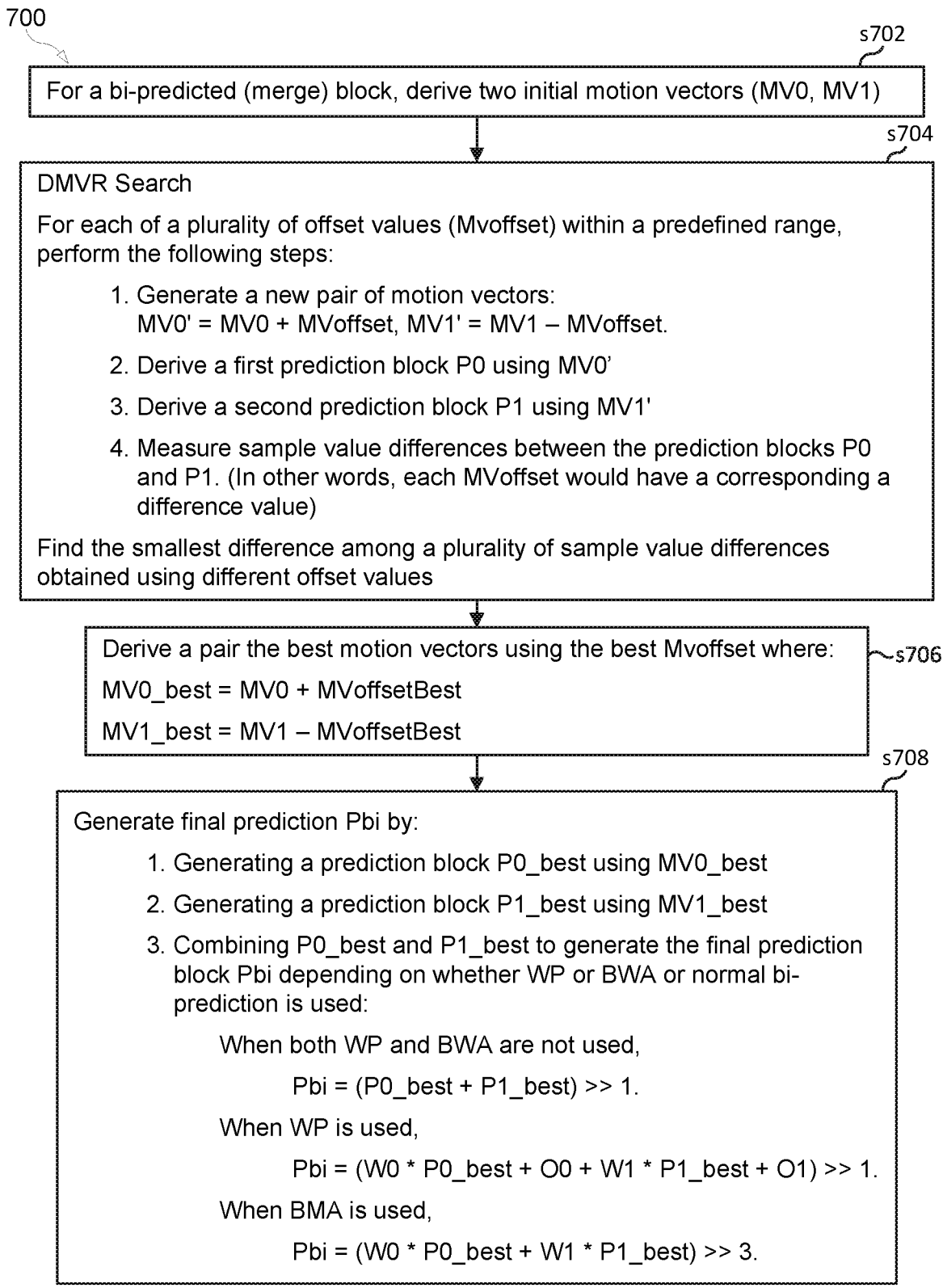
FIG. 7 shows general steps of a DMVR process.

FIG. 7 illustrates an example of DMVR process.

In step s702, two initial motion vectors (MV0 and MV1) are derived for a block of a current picture. For example, a decoder receives a merge index and retrieves MV0 and MV1 from a merge list based on the received merge index.

Figure 8A:
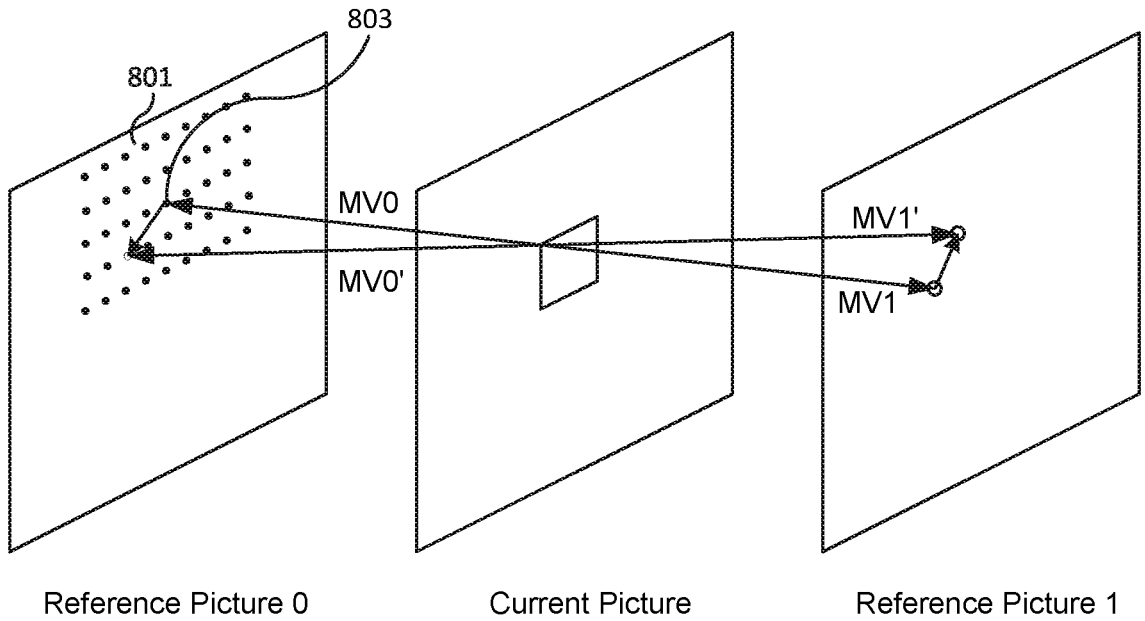
FIGS. 8A and 8B illustrate how modified motion vectors are obtained.
Figure 8B:
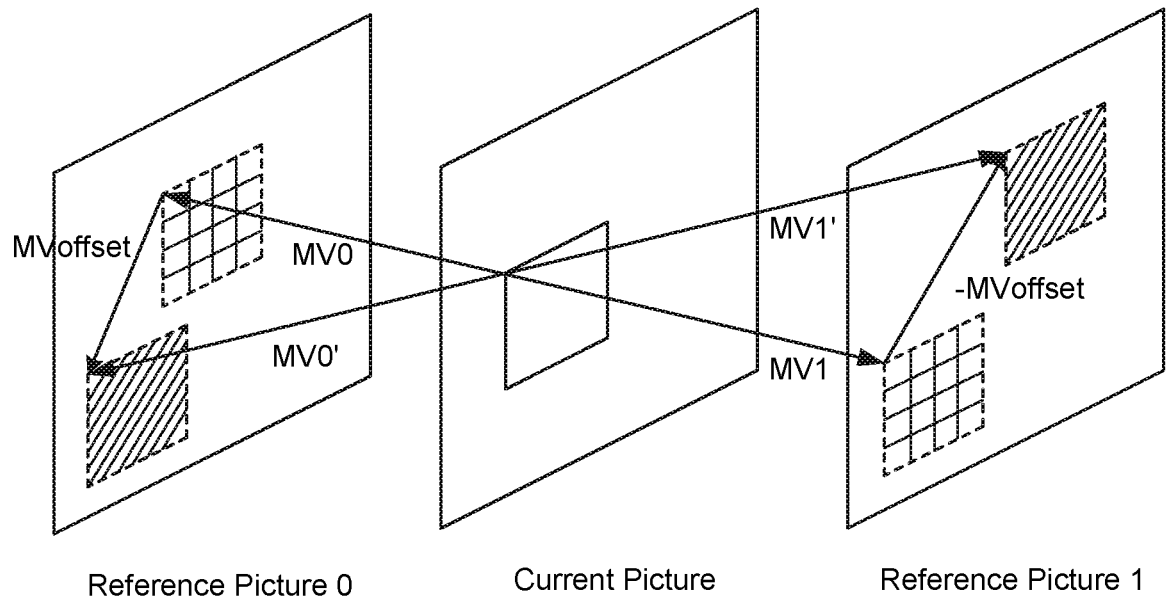

In step s704, two modified motion vectors (MV0' and MV1') are obtained based on MV0, MV1, and an offset (MVoffset). MVoffset corresponds to a point in a search window as shown in FIG. 8A. In FIG. 8A, search window 801 comprises a plurality of circles. Circle 803 (which is the center of the search window 801) represents an initial MV position and other circles of the search window 801 represent various offset candidates. For example, the hollow circle in the search window 801 corresponds to an MVoffset=(-1, 1) to the initial position of MV0. When there is an MVoffset, a first modified motion vector (MV0') is equal to MV0+MVoffset. Also, based on a mirroring rule, a second modified motion vector (MV1') is equal to MV1-MVoffset. In other words, MVoffset represents the offset between the initial MV and a refined MV in one of reference pictures. In VVC (version 4), the refinement search range is two integer luma samples from the initial MV.

Referring back to step s704, after MV0' and MV1' are obtained, a first prediction block (P0) is derived using MV0' and a second prediction block (P1) is derived using MV1'. Then, a sample value difference is calculated using P0 and P1. For example, the sample value difference may be the sum of the absolute differences (SAD) between the two prediction blocks, where $SAD=\Sigma_{x,y}|P0(x, y)-P1(x, y)|$ and P(x,y) represents a sample value at position (x,y) in the block P.

The step of generating MV0' and MV1', the step of deriving P0 and P1 using MV0' and MV1', and the step of calculating a difference using P0 and P1 are repeatedly performed for each offset candidate in the search window. After obtaining a plurality of sample value differences for different offset candidates, the smallest sample value difference among the plurality of sample value differences is determined. The smallest sample value difference corresponds to the best offset (MVoffsetBest).

In step s706, a pair of the best motion vectors (MV0_best and MV1_best) is obtained using the MVoffsetBest and the pair of the initial motion vectors (MV0 and MV1). Specifically, a first best motion vector (MV0_best) may be equal to MV0+MVoffsetBest and a second best motion vector (MV1_best) may be equal to MV1-MVoffsetBest.

In step s708, a first best prediction block (P0_best) is determined using MV0_best and a second best prediction block (P1_best) is determined using MV1_best. The final prediction block (Pbi) is determined using P0_best and P1_best. When both WP and BWA are not enabled, Pbi would be (P0_best+P1_best)>>1. When WP is enabled, Pbi would be (W0×P0_best+O0+W1×P1_best+O1)>>>1. When BWA is enabled, Pbi would be (W0×P0_best+W1×P1_best)>>3.

Figure 9:
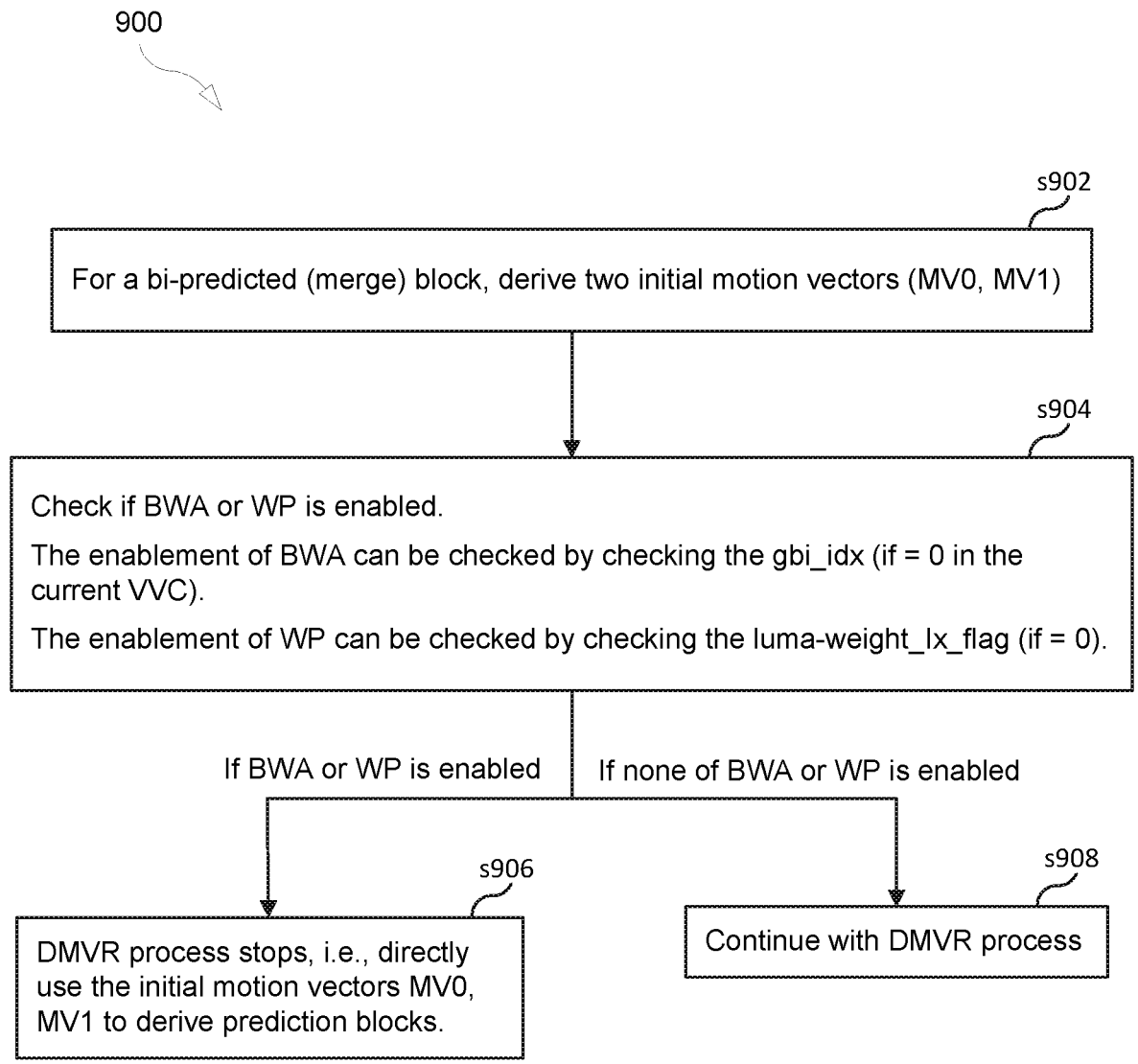
FIG. 9 shows a DMVR process according to one embodiment.

FIG. 9 illustrates a DMVR process 900 according to an embodiment.

Process 900 may begin with step s902. In step s902, initial motion vectors MV0 and MV1 are derived. Step s902 is similar to step s702 in FIG. 7 and the overlapped explanation is thereof omitted.

After obtaining MV0 and MV1, in step s904, a checking is performed as to whether either BWA or WP is enabled for a current block. Whether BWA is enabled or not may be determined by checking a BWA parameter (gbi_idx). For example, gbi_idx is a binary value (0 or 1) and the value of the gbi_idx determines whether BWA is enabled or not.

Whether WP is enabled or not may be determined by checking a parameter (luma_weight_lx_flag). For example, luma_weight_lx_flag is a binary value (0 or 1) and the value of the luma_weight_lx_flag determines whether WP is enabled or not.

If either BWA or WP is enabled, the process 900 is proceeded to step s906.

Step s906 comprises as a result of determining that either BWA or WP is enabled, refraining from refining the initial motion vectors using BWA or WP (e.g., stopping the DMVR process) and directly using MV0 and MV1 to derive prediction blocks.

If none of BWA and WP is enabled, the process 900 is proceeded to step s908.

Step s908 comprises as a result of determining that none of BWA and WP is enabled, continuing the process of refining MV0 and MV1 (i.e., continuing the DMVR process).

Figure 10:
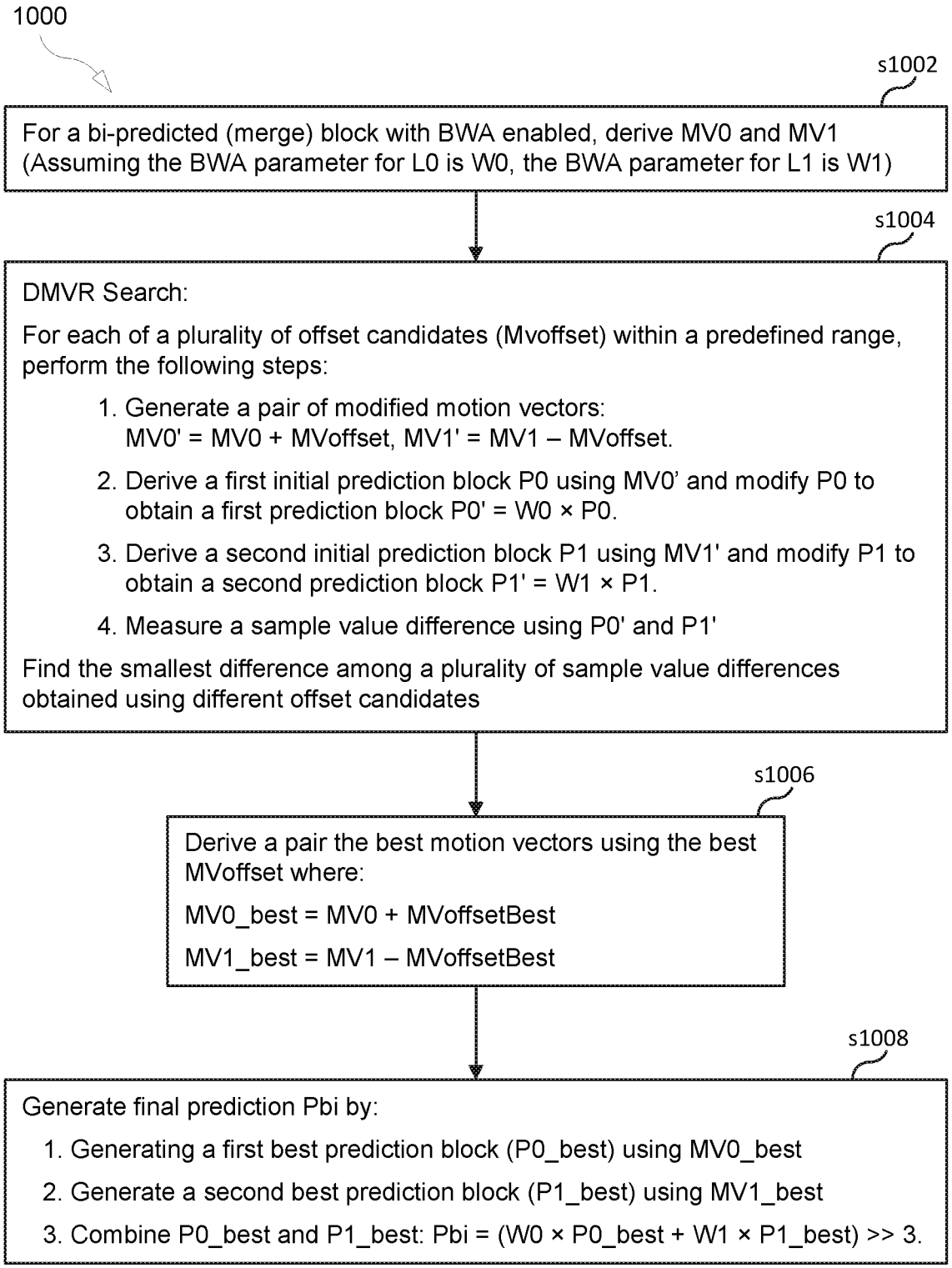
FIG. 10 shows a DMVR process according to one embodiment.

FIG. 10 illustrates a DMVR process 1000 according to an embodiment. In this embodiment, when BWA is enabled for a current block, the DMVR process is modified such that the BWA parameters are considered during the DMVR search. Specifically, during the DMVR search, the generation of a prediction block for reference picture list Lx (x being 0 or 1) involves a subsequent process to modify the prediction block using the corresponding BWA parameters of Lx.

Process 1000 may begin with step s1002. In step s1002, initial motion vectors MV0 and MV1 are derived. Step s1002 is similar to step s702 in FIG. 7 and the overlapped explanation is thereof omitted.

After obtaining MV0 and MV1, in step s1004, DMVR search is performed. Step s1004 is similar to step s704 except for that in determining the sample value difference for a given MVoffset, a first prediction block (P0') and a second prediction block (P1') are used instead of a first initial prediction block (P0) and a second initial prediction block (P1). Specifically, in step s1004, after P0 is obtained using MV0', P0' is obtained by modifying P0 based on a first prediction parameter (W0). For example, P0'=W0×P0. Similarly, after P1 is obtained using MV1', P1' is obtained by modifying P1 based on a second prediction parameter (W1). For example, P1'=W1×P1. P0' and P1' are used for determining the sample value difference for the corresponding offset. Thus, as compared to the DMVR process shown in FIG. 7, the prediction parameters (i.e., BWA parameters) are considered during the DMVR search and this improves the accuracy of the DMVR search.

As explained with respect to step s704, performing step s1004 would result in finding the best offset value (MVoffsetBest) resulting in the smallest sample difference among a plurality of sample value differences obtained using different offset candidates.

In step s1006, after the MVoffsetBest is obtained, the pair of best motion vectors (MV0_best and MV1_best) is obtained. Step s1006 is similar to step s706 in FIG. 7 and the overlapped explanation is thereof omitted.

In step s1008, a first best prediction block (P0_best) is determined using MV0_best and a second best prediction block (P1_best) is determined using MV1_best. The final prediction block (Pbi) is determined using P0_best and P1_best. Pbi may be determined based on (W0×P0_best+W1×P1_best)>>3. For example, Pbi=(W0×P0_best+W1×P1_best)>>3.

FIG. 11 illustrates a DMVR process 1100 according to an embodiment. In this embodiment, when WP is enabled for a current block, the DMVR process is modified such that the WP parameters are considered during the DMVR search. Specifically, during the DMVR search, the generation of a prediction block for reference picture list Lx (x being 0 or 1) involves a subsequent process to modify the prediction block using the corresponding WP parameters of Lx.

Process 1100 may begin with step s1102. In step s1102, initial motion vectors MV0 and MV1 are derived. Step s1102 is similar to step s702 in FIG. 7 and the overlapped explanation is thereof omitted.

After obtaining MV0 and MV1, in step s1104, DMVR search is performed. Step s1104 is similar to step s704 except for that in determining the sample value difference for a given MVoffset, a first prediction block (P0') and a second prediction block (P1') are used instead of a first initial prediction block (P0) and a second initial prediction block (P1). Specifically, in step s1104, after P0 is obtained using MV0', P0' is obtained by modifying P0 based on a first prediction parameter (W0) and a third prediction parameter (O0). For example, P0'=W0×P0+O0. Similarly, after P1 is obtained using MV1', P1' is obtained by modifying P1 based on a second prediction parameter (W1) and a fourth prediction parameter (O1). For example, P1'=W1×P1+O1.

As explained with respect to step s704, performing step s1104 would result in finding the best offset value (MVoffsetBest) resulting in the smallest sample difference among a plurality of sample value differences obtained using different offset candidates.

In step s1106, after the MVoffsetBest is obtained, the pair of best motion vectors (MV0_Best and MV1_Best) is obtained. Step s1106 is similar to step s706 in FIG. 7 and the overlapped explanation is thereof omitted.

In Step s1108, a first best prediction block (P0_best) is determined using MV0_best and a second best prediction block (P1_best) is determined using MV1_best. The final prediction block (Pbi) is determined using P0_best and P1_best. Pbi may be determined based on (W0×P0_best+O0+W1×P1_best+O1)>>1. For example, Pbi=(W0×P0_best+O0+W1×P1_best+O1)>>1.

Figure 12:
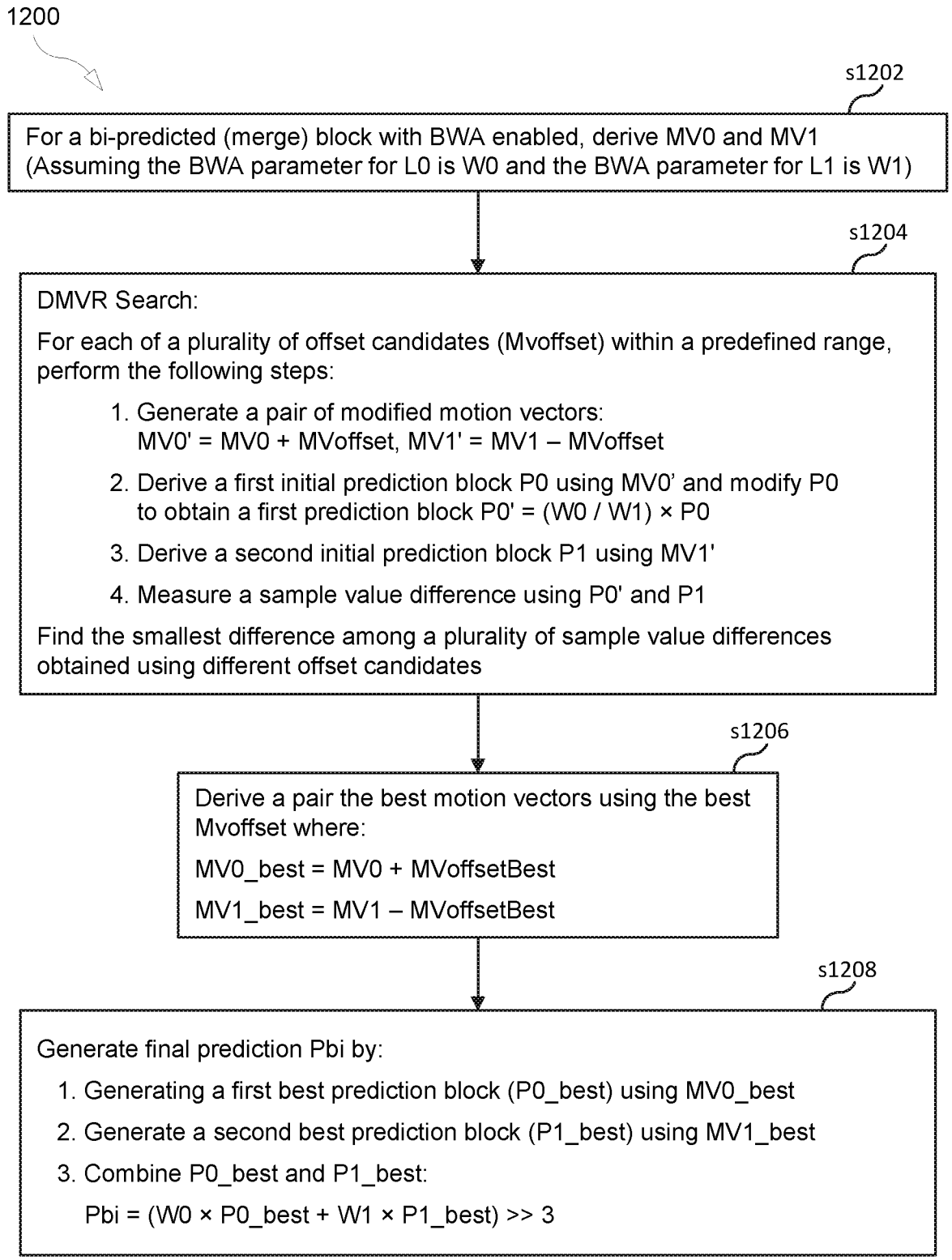
FIG. 12 shows a DMVR process according to one embodiment.

FIG. 12 illustrates a DMVR process 1200 according to an embodiment. The DMVR process 1200 is an alternative scheme to the DMVR process shown in FIG. 10. In the DMVR process 1000, both the first initial prediction block (P0) and the second initial prediction block (P1) are modified and used for calculating the sample value difference. However, in the DMVR process 1200, only one of P0 and P1 is modified. This allows the DMVR process 1200 to achieve a reduced complexity compared to the DMVR process 1000.

Process 1200 may begin with step s1202. In step s1202, initial motion vectors MV0 and MV1 are derived. Step s1202 is similar to step s702 in FIG. 7 and the overlapped explanation is thereof omitted.

After obtaining MV0 and MV1, in step s1204, DMVR search is performed. Step s1204 is similar to step s704 except for that in determining the sample value difference for a given MVoffset, a first prediction block (P0') is used instead of a first initial prediction block (P0). Specifically, in step s1204, after P0 is obtained using MV0', P0' is obtained by modifying P0 based on a first prediction parameter (W0) and a second prediction parameter (W1). For example, P0'=(W0/W1)×P0. The second initial prediction block (P1) is used without modification in calculating the sample value difference.

As explained with respect to step s704, performing step s1204 would result in finding the best offset value (MVoffsetBest) resulting in the smallest sample difference among a plurality of sample value differences obtained using different offset values.

In step s1206, after the MVoffsetBest is obtained, the pair of best motion vectors (MV0_best and MV1_best) is obtained. Step s1206 is similar to step s706 in FIG. 7 and the overlapped explanation is thereof omitted.

In Step s1208, a first best prediction block (P0_best) is determined using MV0_best and a second best prediction block (P1_best) is determined using MV1_best. The final prediction block (Pbi) is determined using P0_best and P1_best. Specifically, Pbi may be determined based on (W0×P0_best+W1×P1_best)>>3. For example, Pbi=(W0× P0_best+W1×P1_best)>>3.

In some embodiments, the second initial prediction block (P1) instead of the first initial prediction block (P0) may be modified during the DMVR search. For example, during the DMVR search, P1 may be modified to be P1'=(W1/W0)×P1.

Figure 13:
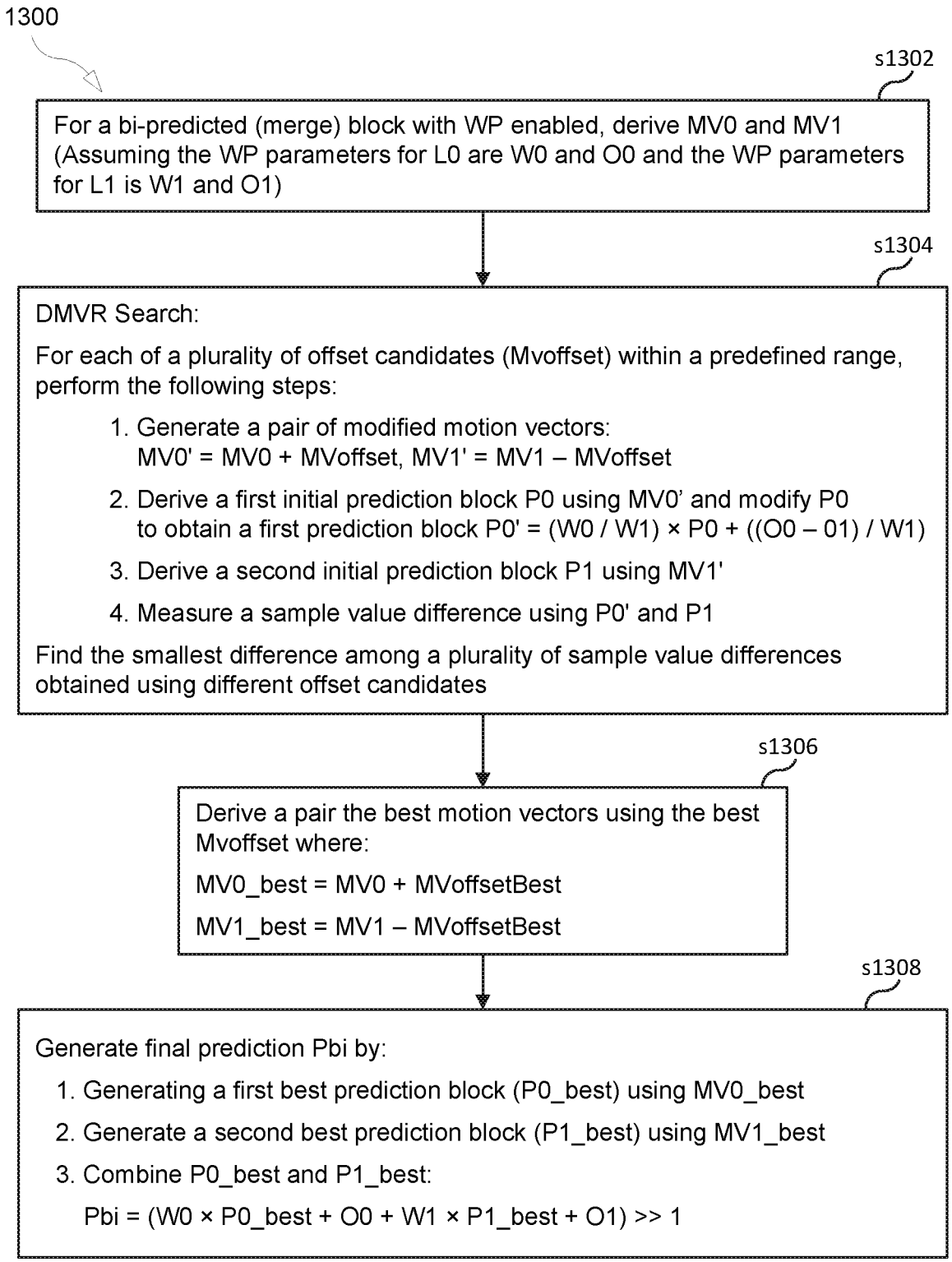
FIG. 13 shows a DMVR process according to one embodiment.

FIG. 13 illustrates a DMVR process 1300 according to an embodiment. The DMVR process 1300 is an alternative scheme to the DMVR process shown in FIG. 11. In the DMVR process 1100, both the first initial prediction block (P0) and the second initial prediction block (P1) are modified and used for calculating the sample value difference. However, in the DMVR process 1300, only one of P0 and P1 is modified. This allows the DMVR process 1300 to achieve a reduced complexity compared to the DMVR process 1100.

Process 1300 may begin with step s1302. In step s1302, initial motion vectors MV0 and MV1 are derived. Step s1302 is similar to step s702 in FIG. 7 and the overlapped explanation is thereof omitted.

After obtaining MV0 and MV1, in step s1304, DMVR search is performed. Step s1304 is similar to step s704 except for that in determining the sample value difference for a given MVoffset, a first prediction block (P0') is used instead of a first initial prediction block (P0). Specifically, in step s1304, after P0 is obtained using MV0', P0' is obtained by modifying P0 based on a first prediction parameter (W0), a second prediction parameter (W1), a third prediction parameter (O0), and a fourth prediction parameter (O1). For example, P0'=(W0/W1)×P0+((O0−O1)/W1). The second initial prediction block (P1) is used without modification in calculating the sample value difference.

As explained with respect to step s704, performing step s1304 would result in finding the best offset value (MVoffsetBest) resulting in the smallest sample difference among a plurality of sample value differences obtained using different offset values.

In step s1306, after the MVoffsetBest is obtained, the pair of best motion vectors (MV0_best and MV1_best) is obtained. Step s1306 is similar to step s706 in FIG. 7 and the overlapped explanation is thereof omitted.

In Step s1308, a first best prediction block (P0_best) is determined using MV0_best and a second best prediction block (P1_best) is determined using MV1_best. The final prediction block (Pbi) is determined using P0_best and P1_best. Pbi may be determined based on (W0×P0_best+O0+W1×P1_best+O1)>>1. For example, Pbi=(W0× P0_best+O0+W1×P1_best+O1)>>1.

In some embodiments, the second initial prediction block (P1) instead of the first initial prediction block (P0) may be modified during the DMVR search. For example, during the DMVR search, P1 may be set as (W1/W0)×P1+((O1−O0)/ W0).

Figure 14:
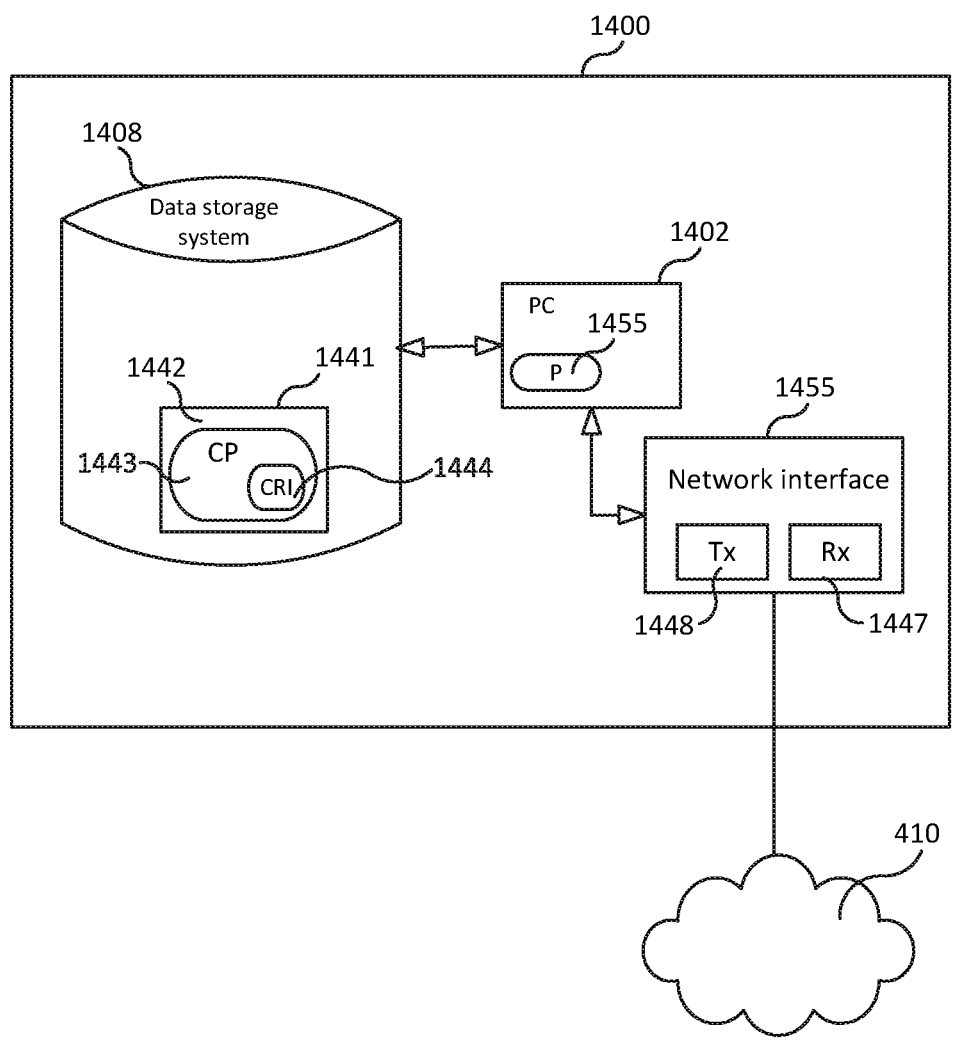
FIG. 14 is a block diagram illustrating an apparatus, according to an embodiment, for implementing an encoder or a decoder.

FIG. 14 is a block diagram of an apparatus 1400 for implementing encoder 402 or decoder 404. As shown in FIG. 14, apparatus 1400 may comprise: processing circuitry (PC) 1402, which may include one or more processors (P) 1455 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed; a network interface 1445 comprising a transmitter (Tx) 1448 and a receiver (Rx) 1447 for enabling apparatus 1400 to transmit data to and receive data from other nodes connected to network 410 (e.g., an Internet Protocol (IP) network) to which network interface 1445 is connected; and a local storage unit (a.k.a., "data storage system") 1408, which may include one or more non-volatile storage devices and/or one or more volatile storage devices. In embodiments where PC 1402 includes a programmable processor, a computer program product (CPP) 1441 may be provided. CPP 1441 includes a computer readable medium (CRM) 1442 storing a computer program (CP) 1443 comprising computer readable instructions (CRI) 1444. CRM 1442 may be a non-transitory computer readable medium, such as, magnetic media (e.g., a hard disk), optical media, memory devices (e.g., random access memory, flash memory), and the like. In some embodiments, the CRI 1444 of computer program 1443 is configured such that when executed by PC 1402, the CRI causes apparatus 1400 to perform steps described herein (e.g., steps described herein with reference to the flow charts). In other embodiments, apparatus 1400 may be configured to perform steps described herein without the need for code. That is, for example, 1402 may consist merely of one or more ASICs. Hence, the features of the embodiments described herein may be implemented in hardware and/or software.

Figure 15:
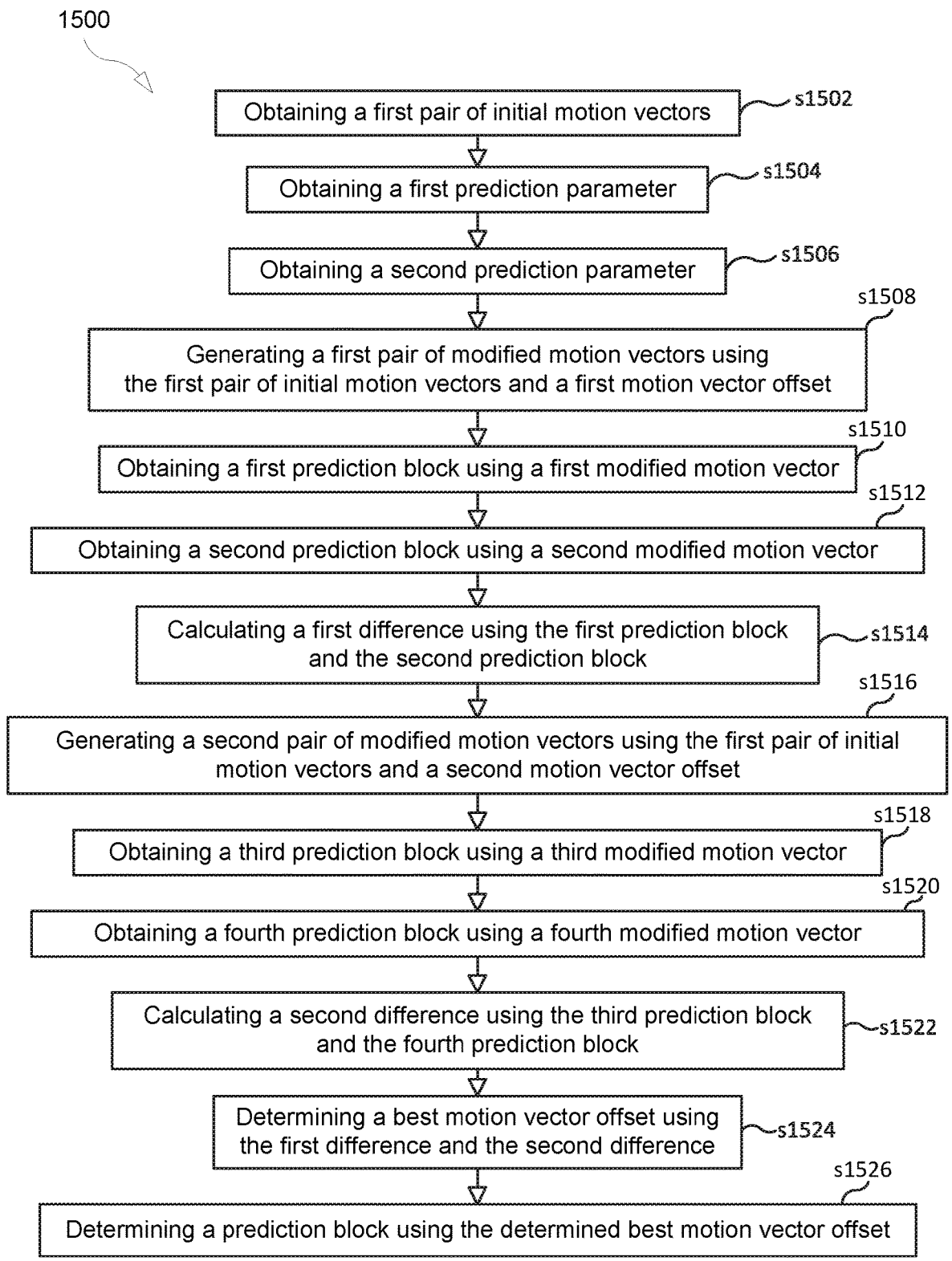
FIG. 15 is a flow chart illustrating a process according to some embodiments.

FIG. 15 is a flowchart illustrating a process 1500 for determining a prediction block. Process 1500 may begin in step s1502.

Step s1502 comprises obtaining a first pair of initial motion vectors.

Step s1504 comprises obtaining a first prediction parameter.

Step s1506 comprises obtaining a second prediction parameter.

Step s1508 comprises generating a first pair of modified motion vectors using the first pair of initial motion vectors and a first motion vector offset, the first pair of modified motion vectors comprising a first modified motion vector and a second modified motion vector.

Step s1510 comprises obtaining a first prediction block using the first modified motion vector.

Step s1512 comprises obtaining a second prediction block using the second modified motion vector.

Step s1514 comprises calculating a first difference using the first prediction block and the second prediction block.

Step s1516 comprises generating a second pair of modified motion vectors using the first pair of initial motion vectors and a second motion vector offset, the second pair of modified motion vectors comprising a third modified motion vector and a fourth modified motion vector.

Step s1518 comprises obtaining a third prediction block using the third modified motion vector.

Step s1520 comprises obtaining a fourth prediction (P4) block using the fourth modified motion vector.

Step s1522 comprises calculating a second difference using the third prediction block and the fourth prediction block.

Step s1524 comprises determining a best motion vector offset using the first difference and the second difference.

Step s1526 comprises determining the prediction block using the determined best motion vector offset.

In some embodiments, process 1500 further includes determining a first best motion vector using the first initial motion vector and the best motion vector offset, determining a second best motion vector using the second initial motion vector and the best motion vector offset, generating a first best prediction block using the first best motion vector, generating a second best prediction block using the second best motion vector, and determining the prediction block based on a multiplication of the first best prediction block and the first prediction parameter and a multiplication of the second best prediction block and the second prediction parameter.

In some embodiments, obtaining the second prediction block comprises deriving an initial second prediction block using the second modified motion vector and deriving the second prediction block using the initial second prediction block and at least the second prediction parameter and obtaining the fourth prediction block comprises deriving an initial fourth prediction block using the fourth modified motion vector and deriving the fourth prediction block using the initial fourth prediction block and at least the second prediction parameter.

In some embodiments, the first prediction block is derived based on a multiplication of the initial first prediction block and the first prediction parameter and the second prediction block is derived based on a multiplication of the initial second prediction block and the second prediction parameter.

In some embodiments, the first prediction block is derived based on (W1/W2)*Pi1 where W1 is the first prediction parameter, W2 is the second prediction parameter, and Pi1 is the initial first prediction block.

In some embodiments, process 1500 further includes obtaining a third prediction parameter and obtaining a fourth prediction parameter.

In some embodiments, the prediction block is determined based on (W1×P1_best)+O3+(W2×P2_best)+O4 where W1 is the first prediction parameter, P1_best is the first best prediction block, O3 is the third prediction parameter, W2 is the second prediction parameter, P2_best is the second best prediction block, and O4 is the fourth prediction parameter.

In some embodiments, the first prediction block is derived further based on at least the third prediction parameter.

In some embodiments, the first prediction block is derived further based on a difference between a third prediction parameter and a fourth prediction parameter.

In some embodiments, the first prediction parameter is one of parameters for weighted prediction or one of parameters for generalized bi-prediction with weighted averaging.

Figure 16:
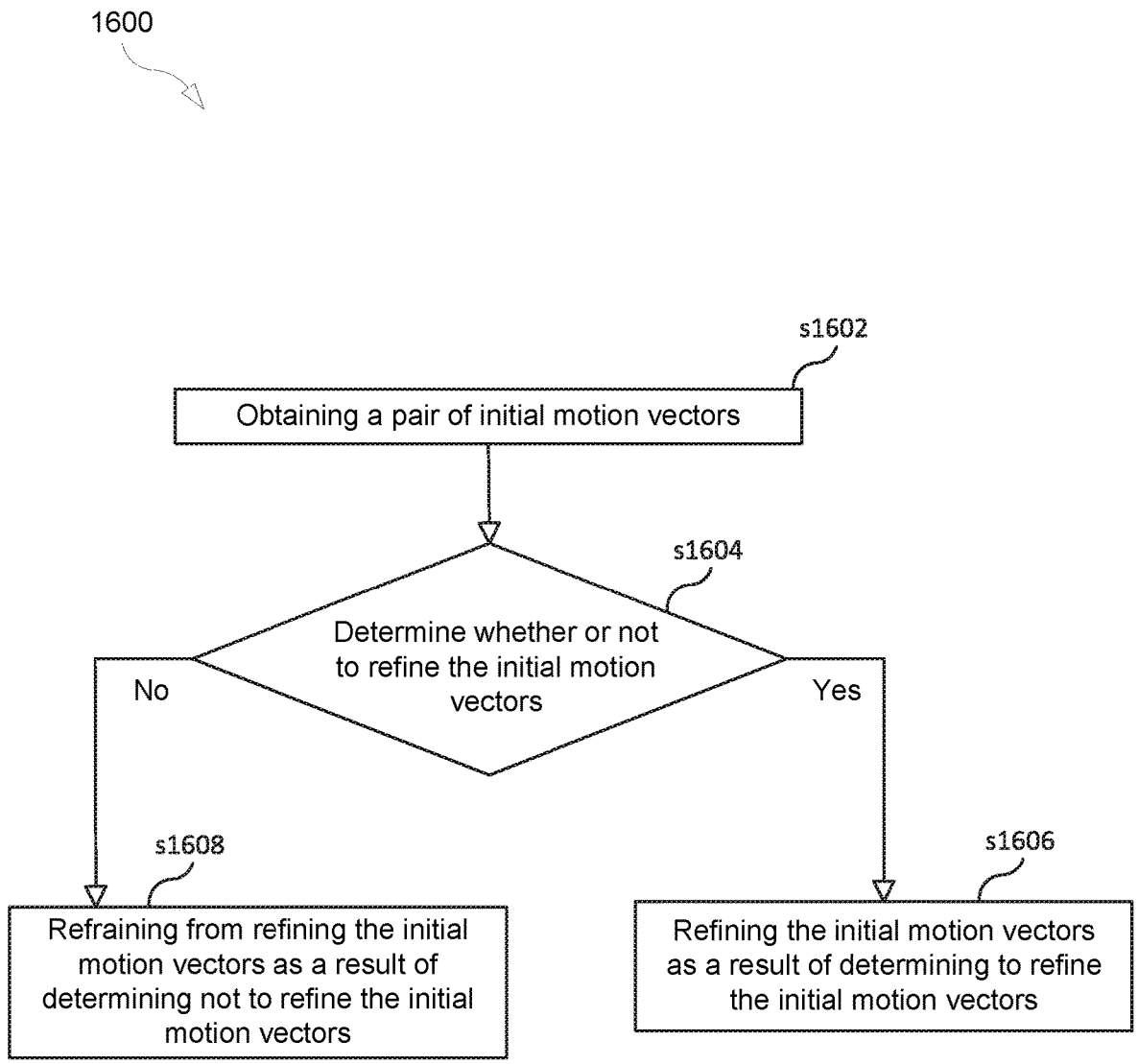
FIG. 16 is a flow chart illustrating a process according to some embodiments.

FIG. 16 is a flowchart illustrating a process 1600 for determining a prediction block. Process 1600 may begin in step s1602.

Step s1602 comprises obtaining a pair of initial motion vectors.

Step s1604 comprises determining whether or not to refine the initial motion vectors, wherein determining whether or not to refine the initial motion vectors comprises determining whether or not a first prediction scheme is enabled.

Step s1606 comprises refining the initial motion vectors as a result of determining to refine the initial motion vectors, and the prediction block is generated using the refined motion vectors. Step s1608 comprises refraining from refining the initial motion vectors as a result of determining not to refine the initial motion vectors, and the prediction block is generated using the initial motion vectors.

In some embodiments, determining whether or not to refine the initial motion vectors further comprises determining whether or not a second prediction scheme is enabled. In some embodiments, the first prediction scheme is weighted prediction and the second prediction scheme is generalized bi-prediction with weighted averaging. In some embodiments, determining whether or not to refine the initial motion vectors further comprises: determining to refrain from refining the initial motion vectors as a result of determining that either the first prediction scheme or second prediction scheme is enabled; or determining to refine the initial motion vectors as a result of determining neither the first prediction scheme nor second prediction scheme is enabled.

Summary of Various Embodiments

A1. A method (1500) for determining a prediction block (Pbi) for decoding or encoding a current block in a current picture of a video stream, the method comprising: obtaining a first pair of initial motion vectors (s1502), the first pair of initial motion vectors comprising a first initial motion vector (MV1) and a second initial motion vector (MV2); obtaining a first prediction parameter (W1) (s1504); obtaining a second prediction parameter (W2) (s1506); generating a first pair of modified motion vectors using the first pair of initial motion vectors and a first motion vector offset (MVoffset1) (s1508), the first pair of modified motion vectors comprising a first modified motion vector (MV1') and a second modified motion vector (MV2'); obtaining a first prediction block (P1) using the first modified motion vector (s1510); obtaining a second prediction block (P2) using the second modified motion vector (s1512); calculating a first difference using the first prediction block and the second prediction block (s1514); generating a second pair of modified motion vectors using the first pair of initial motion vectors and a second motion vector offset (MVoffset2) (s1516), the second pair of modified motion vectors comprising a third modified motion vector (MV3') and a fourth modified motion vector (MV4'); obtaining a third prediction block (P3) using the third modified motion vector (s1518); obtaining a fourth prediction (P4) block using the fourth modified motion vector (s1520); calculating a second difference using the third prediction block and the fourth prediction block (s1522); determining a best motion vector offset using the first difference and the second difference (s1524); and determining the prediction block (Pbi) using the determined best motion vector offset (S1526), wherein obtaining the first prediction block (P1) comprises deriving an initial first prediction block (Pi1) using the first modified motion vector and deriving P1 using Pi1 and at least the first prediction parameter (W1), and obtaining the third prediction block (P3) comprises deriving an initial third prediction block (Pi3) using the third modified motion vector and deriving P3 using Pi3 and at least the first prediction parameter (W1).

A2. The method of embodiment A1, further comprising: determining a first best motion vector (MV1_best) using the first initial motion vector (MV1) and the best motion vector offset (MVoffsetBest); determining a second best motion vector (MV2_best) using the second initial motion vector (MV2) and the best motion vector offset (MVoffsetBest); generating a first best prediction block (P1_best) using the first best motion vector (MV1_best); generating a second best prediction block (P2_best) using the second best motion vector (MV2_best); and determining the prediction block (Pbi) based on a multiplication of the first best prediction block (P1_best) and the first prediction parameter (W1) and a multiplication of the second best prediction block (P2_best) and the second prediction parameter (W2).

A3. The method of embodiment A1-A2, wherein obtaining the second prediction block (P2) comprises deriving an initial second prediction block (Pi2) using the second modified motion vector and deriving the second prediction block (P2) using the initial second prediction block (Pi2) and at least the second prediction parameter (W2); and obtaining the fourth prediction block (P4) comprises deriving an initial fourth prediction block (Pi4) using the fourth modified motion vector and deriving the fourth prediction block (P4) using the initial fourth prediction block (Pi4) and at least the second prediction parameter (W2).

A4. The method of embodiment A3, wherein the first prediction block (P1) is derived based on a multiplication of the initial first prediction block (Pi1) and the first prediction parameter (W1), and the second prediction block (P2) is derived based on a multiplication of the initial second prediction block (Pi2) and the second prediction parameter (W2).

A5. The method of embodiment A1-A2, wherein the first prediction block (P1) is derived based on (W1/W2)*Pi1 where W1 is the first prediction parameter, W2 is the second prediction parameter, and Pi1 is the initial first prediction block (Pi1).

A6. The method of embodiment A1-A5, further comprising: obtaining a third prediction parameter (O3); and obtaining a fourth prediction parameter (O4).

A7. The method of embodiment A6, wherein the prediction block (Pbi) is determined based on (W1×P1_best)+O3+(W2×P2_best)+O4 where W1 is the first prediction parameter, P1_best is the first best prediction block, O3 is the third prediction parameter, W2 is the second prediction parameter, P2_best is the second best prediction block, and O4 is the fourth prediction parameter.

A8. The method of embodiment A7, wherein the first prediction block (P1) is derived further based on at least the third prediction parameter (O3).

A9. The method of embodiment A7, wherein the first prediction block (P1) is derived further based on a difference between a third prediction parameter (O3) and a fourth prediction parameter (O4).

A10. The method of embodiment A1-A9, wherein the first prediction parameter (W1) is one of parameters for weighted prediction or one of parameters for generalized bi-prediction with weighted averaging (BWA).

B1. A method (1600) for determining a prediction block (Pbi) for decoding or encoding a current block in a current picture of a video stream, the method comprising: obtaining a pair of initial motion vectors (s1602), the pair of initial motion vectors comprising a first initial motion vector (MV1) and a second initial motion vector (MV2); determining whether or not to refine the initial motion vectors (s1604); and refining the initial motion vectors as a result of determining to refine the initial motion vectors (s1606), wherein determining whether or not to refine the initial motion vectors comprises: determining whether a first prediction scheme and/or a second prediction scheme is enabled; and determining to refrain from refining the initial motion vectors as a result of determining that either the first prediction scheme or second prediction scheme is enabled or determining to refine the initial motion vectors as a result of determining neither the first prediction scheme nor second prediction scheme is enabled.

B2. The method of embodiment B1, wherein the first prediction scheme is weighted prediction (WP) and the second prediction scheme is generalized bi-prediction with weighted averaging (BWA).

C1. An encoder or decoder apparatus (1400), the apparatus (1400) being adapted to: determine a prediction block (Pbi) for encoding or decoding a current block in a current picture of a video stream, wherein the apparatus is adapted such that the apparatus determines the prediction block by performing a process that includes: obtaining a first pair of initial motion vectors (s1502), the first pair of initial motion vectors comprising a first initial motion vector (MV1) and a second initial motion vector (MV2); obtaining a first prediction parameter (W1) (s1504); obtaining a second prediction parameter (W2) (s1506); generating a first pair of modified motion vectors using the first pair of initial motion vectors and a first motion vector offset (MVoffset1) (s1508), the first pair of modified motion vectors comprising a first modified motion vector (MV1') and a second modified motion vector (MV2'); obtaining a first prediction block (P1) using the first modified motion vector (s1510); obtaining a second prediction block (P2) using the second modified motion vector (s1512); calculating a first difference using the first prediction block and the second prediction block (s1514); generating a second pair of modified motion vectors using the first pair of initial motion vectors and a second motion vector offset (MVoffset2) (s1516), the second pair of modified motion vectors comprising a third modified motion vector (MV3') and a fourth modified motion vector (MV4'); obtaining a third prediction block (P3) using the third modified motion vector (s1518); obtaining a fourth prediction (P4) block using the fourth modified motion vector (s1520); calculating a second difference using the third prediction block and the fourth prediction block (s1522); determining a best motion vector offset using the first difference and the second difference (s1524); and determining the prediction block (Pbi) using the determined best motion vector offset (S1526), wherein obtaining the first prediction block (P1) comprises deriving an initial first prediction block (Pi1) using the first modified motion vector and deriving P1 using Pi1 and at least the first prediction parameter (W1), and obtaining the third prediction block (P3) comprises deriving an initial third prediction block (Pi3) using the third modified motion vector and deriving P3 using Pi3 and at least the first prediction parameter (W1).

C2. The apparatus of embodiment C1, wherein the apparatus is further adapted to perform the steps of any one of embodiments A2-10.

D1. An encoder or decoder apparatus (1400), the apparatus (1400) being adapted to: determine a prediction block (Pbi) for encoding or decoding a current block in a current picture of a video stream, wherein the apparatus is adapted such that the apparatus determines the prediction block by performing a process that includes: obtaining a pair of initial motion vectors (s1602), the pair of initial motion vectors comprising a first initial motion vector (MV1) and a second initial motion vector (MV2); determining whether or not to refine the initial motion vectors (s1604); and refining the initial motion vectors as a result of determining to refine the initial motion vectors (s1606), wherein determining whether or not to refine the initial motion vectors comprises: determining whether a first prediction scheme and/or a second prediction scheme is enabled; and determining to refrain from refining the initial motion vectors as a result of determining that either the first prediction scheme or second prediction scheme is enabled or determining to refine the initial motion vectors as a result of determining neither the first prediction scheme nor second prediction scheme is enabled.

D2. The apparatus of embodiment D1, wherein the first prediction scheme is weighted prediction (WP) and the second prediction scheme is generalized bi-prediction with weighted averaging (BWA).

E1. A computer program, comprising instructions which, when executed on at least one processor, cause the at least one processor to carry out the method according to any one of embodiments A1-A10 or B1-B2.

E2. A carrier containing the computer program of embodiment E1, wherein the carrier is one of an electronic signal, optical signal, radio signal, or computer readable storage medium.

While various embodiments are described herein (including the attached appendices which contain proposals to modify a 3GPP standard), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining a prediction block for decoding or encoding a current block in a current picture of a video stream, the method comprising:
    obtaining a pair of initial motion vectors, the pair of initial motion vectors comprising a first initial motion vector and a second initial motion vector;
    determining that a weighted prediction (WP) tool is not enabled;
    determining that a bi-prediction with weighted averaging (BWA) tool is not enabled; and
    refining the initial motion vectors as a result of determining that i) the WP tool is not enabled and ii) the BWA tool is also not enabled.

2. The method of claim 1, further comprising generating the prediction block using the refined motion vectors.

3. A non-transitory computer readable medium storing a computer program comprising instructions which, when executed by processing circuitry, causes the processing circuitry to perform a method comprising:
    obtaining a pair of initial motion vectors, the pair of initial motion vectors comprising a first initial motion vector and a second initial motion vector;
    determining that a weighted prediction (WP) tool is not enabled;
    determining that a bi-prediction with weighted averaging (BWA) tool is not enabled; and
    as a result of determining that i) the WP tool is not enabled and ii) the BWA tool is also not enabled, refining the initial motion vectors.

4. An apparatus, the apparatus comprising:
    memory; and
    processing circuitry, wherein the apparatus is configured to:
    obtain a pair of initial motion vectors, the pair of initial motion vectors comprising a first initial motion vector and a second initial motion vector;
    determine whether a weighted prediction (WP) tool is not enabled; and
    determining whether bi-prediction with weighted averaging (BWA) tool is not enabled, wherein
    the apparatus is further configured such that, as a result of the apparatus determining that i) the WP tool is not enabled and ii) the BWA tool is also not enabled, the apparatus refines the initial motion vectors.

5. The apparatus of claim 4, wherein the apparatus is further adapted to:
    generate the prediction block using the refined motion vectors if it is determined to refine the initial motion vectors, or
    generate the prediction block using the initial motion vectors if it is determined not to refine the initial motion vectors.

* * * * *

UNITED STATES PATENT AND TRADEMARK OFFICE
CERTIFICATE OF CORRECTION

| | | |
|---|---|---|
| PATENT NO. | : 12,149,730 B2 | Page 1 of 1 |
| APPLICATION NO. | : 17/438037 | |
| DATED | : November 19, 2024 | |
| INVENTOR(S) | : Yu et al. | |

It is certified that error appears in the above-identified patent and that said Letters Patent is hereby corrected as shown below:

In the Specification

In Column 3, Line 8, delete "for (i = 0, i <= num_ref_idx_l0 active_minus1; i++) {" and insert -- for (i = 0; i <= num_ref_idx_l0_active_minus1; i++) { --, therefor.

In Column 8, Line 7, delete "form" and insert -- from --, therefor.

In Column 8, Line 10, delete "form" and insert -- from --, therefor.

Signed and Sealed this
Twenty-second Day of April, 2025

Coke Morgan Stewart
*Acting Director of the United States Patent and Trademark Office*